United States Patent [19]

Hill et al.

[11] Patent Number: 4,764,422
[45] Date of Patent: Aug. 16, 1988

[54] ELECTRICALLY CONDUCTIVE COMPOSITE MATERIAL

[75] Inventors: Frederick W. L. Hill, Lechlade; Nigel R. Bates; Leo G. Svendsen, both of Swindon, all of England

[73] Assignee: Raychem Limited, London, England

[21] Appl. No.: 933,459

[22] Filed: Nov. 21, 1986

[30] Foreign Application Priority Data

Nov. 22, 1985 [GB] United Kingdom ............... 8528808

[51] Int. Cl.⁴ .................... B32B 5/14; B32B 5/18
[52] U.S. Cl. .................... 428/309.9; 428/311.1; 428/311.5; 428/312.8; 428/320.2; 428/322.2; 428/913
[58] Field of Search ............. 428/306.6, 307.3, 308.4, 428/309.9, 311.1, 311.5, 312.2, 312.8, 304.4, 319.1, 320.2, 322.7, 913

[56] References Cited

U.S. PATENT DOCUMENTS 3,707,401 12/1972 Jarema et al. ............... 428/312.2
4,576,859 3/1986 Oyachi et al. ............... 428/312.2

Primary Examiner—William J. Van Balen
Attorney, Agent, or Firm—Herbert G. Burkard

[57] ABSTRACT

Electrically conductive composite material comprises:
  (a) an open-celled cellular structure of polymeric material, preferably an open-celled foam, having electrically conductive material on at least its interior surface defining the cells, e.g. deposited metal; and
  (b) substantially solid, preferably non-conductive, material overlying and/or filling the cellular structure.

The solid material (b) is preferably polymeric and may be formed in situ by polymerization of a monomer oligomer or may be introduced e.g. in molten form.

The material is useful for electromagnetic shielding, e.g. for cable feedthrough glands or dimensionally recoverable articles.

13 Claims, 1 Drawing Sheet

U.S. Patent   Aug. 16, 1988   4,764,422
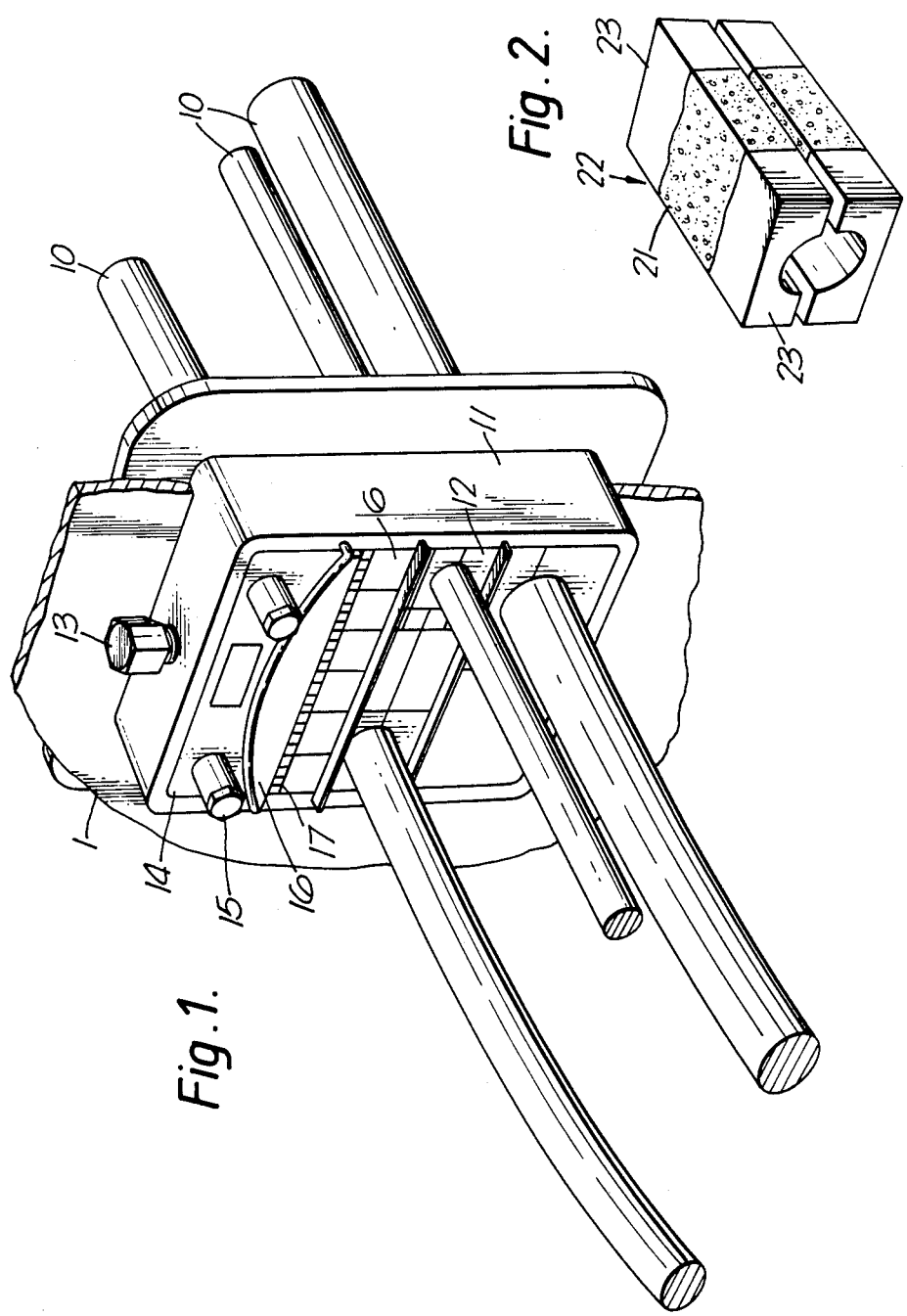

ELECTRICALLY CONDUCTIVE COMPOSITE MATERIAL

This invention relates to an electrically conductive composite material, and to articles using electrically conductive composite material.

Known electrically conductive composites include a "felt" sheet of sintered metal fibres filled with silicone elastomer, which is used in flat gaskets to provide environmental sealing and EMI shielding continuity between mating surfaces in electrical equipment. Elastomer filled metal screens, woven or knitted metal filled with elastomer, and sheets of elastomers filled with carbon or metal particles or fibres are also known for such gaskets.

The present invention provides a new composite having an advantageous combination of high electrical conductivity and desirable retention of the filling polymer characteristics.

The invention accordingly provides an electrically conductive composite material comprising
  (a) an open-celled cellular structure of polymeric material having electrically conductive material on at least its interior surface defining the cellular free space, and
  (b) substantially solid filling material substantially filling at least part of the cellular free space. The composite material according to this invention is able to provide a substantially continuous three-dimensional network of the electrically conductive material giving good conductivity while minimising the amount of metal present in the composite, since a thin layer of the conductive material on the cell-defining interior surface of the polymer structure will suffice. Because the conductive material is thus minimised, the composite is enabled to retain much of the character of the filling material. In preferred forms, where the filling is flexible e.g. elastomeric, the cellular structure and the conductive material, (usually metal), cna be sufficiently flexible for the composite to be largely elastomeric in character. The filling material filling the cellular structure helps to retain the integrity of the electrically conductive material even when the composite is subjected to considerable deformation.

The open-celled cellular structure is preferably provided by applying electrically conductive material to the interior surface of open-celled cellular polymeric material, which may be prepared by any convenient method, such as sintering or otherwise bonding together polymer fibres, but is preferably a foamed polymer within which membranes between adjacent cells have been removed by known techniques. Alternatively, polymer fibres already coated with the conductive material could be sintered to provide the electrically conductive cellular structure.

The electrically conductive material may be of any kind and in any form and applied in any way which provides a level of electrical conductivity desired for the end use of a given composite, but is preferably a substantially continuous coating on the free-space defining interior surface of the cellular structure. The conductive material is preferably a metal, and is preferably plated onto the polymer e.g. by electroless plating and/or electroplating, preferably after suitable surface treatment of the polymer, e.g. acid etching.

When the filling material is substantially electrically non-conductive, e.g. polymeric or elastomeric material the present invention has the advantage that the insulating filling polymer cannot disrupt the conductivity of the substantially continuous coating of the electrically conductive material preferably present on the interior surface of the cellular structure. In contrast with this, a woven or non-woven structure of individual fibres would suffer from reduced conductivity due to the filling polymer intruding between the fibres and increasing the electrical resistance at the inter-fibre contact points.

From this aspect, therefore, the present invention provides an electrically conductive composite material comprising
  (a) an open-celled cellular structure of polymeric material having electrically conductive material on at least its interior surface defining the cellular free space, and
  (b) substantially solid substantially electrically non-conductive material overlying the electrically conductive material.

The non-conductive material preferably substantially fills the cellular free space to provide a composite having the features hereinbefore described.

The cell size of the cellular structure influences the flexibility and conductivity of the composite, and average cell diameter within the range from 0.01 to 10 millimeters preferably 0.2 to 2 millimeters, being preferred, and the cellular free space preferably comprises from 45 to 99% by volume of the unfilled cellular structure.

Polymeric filling material may be formed in situ by polymerisation of a monomer or oligomer within the cellular structure, or may be introduced thereinto in a flowable state and thereafter solidifed, e.g. by solidification of molten polymer or by drying of a solution or dispersion of polymer in a fluid carrier, or by cross-linking a flowable polymer.

The materials used in the composite may be selected according to the end use properties desired. The polymer which forms the cellular structure carrying the electrically conductive material may any comprise suitable cellular polymer, for example polyester, polyamide, polyurethane, polyolefins.

The electrically conductive material may be an inherently conductive polymer e.g. polyacetylene or polypyrrole, or a polymer filled with electrically conductive filler to a level giving acceptable conductivity, but is preferably a metal, e.g. copper, silver, nickel, cobalt or tin/lead alloys.

The filling material may be chosen to provide the desired properties, and may for some purposes be a metallic composition such as solder or an electrically conductive polymer or polymer composition. Substantially electrically non-conductive polymers are, however, preferred, elastomers being especially useful for environmental sealing purposes, e.g. in cable feedthrough glands. Suitable elastomers include, for example polyrethanes, silicon rubber, polysulphides, polyamides. Other potentially useful fillings include hot melt adhesives, gels, thermoplastics, epoxies and other thermosetting compositions, and systems which are polymerisable in situ within the cellular structure.

The composite materials in accordance with the invention may be used in areas other than the production of feedthrough glands. For example they may be incorporated within a dimensionally recoverable article, e.g. a heat-shrinkable article, in order to provide electromagnetic shielding for the article and the enclosed equipment. Electrically shielded heat-shrinkable articles ae described in U.S. Pat. No. 4,467,002 the disclosure of which is incorporated herein by reference.

The appearance of the electrically conductive composite can readily be imagined from the preceding description without the need to resort to drawings. Use in cable feedthrough glands of electrically conductive composites having the advantageous cellular structure instead of fibrous or particulate conductive material is new, and will therefore now be described with reference to the accompanying drawings. In this aspect, the invention provides a composite material, wherein the non-conductive material substantially fills the cellular free space. The composite seal is preferably as hereinbefore described, although for some purposes less than complete filling and/or fillings other than polymers may be desirable.

Referring to the drawings, FIG. 1 shows one type of gland used in ships, industrial plants, public buildings, power stations, etc.

The various cables 10 are passed through the gland frame 11 in wall 1, and to complete the installation pairs of rubber blocks 12 with semi circular channels are fitted around each cable to form a rectangular matrix filling the frame. Blanking blocks 6 fill any unused spaces. The whole assembly is then compressed mechanically in a plane at right angles to the cables by compression bolt 13 acting on compression assembly 14, 15, 16, 17 which is slidable within the frame 11, thus closing any gaps in the matrix and clamping and sealing on to the cable jackets.

So that the rubber blocks according to the present invention will electrically connect the outer braided screens of the cables to the gland frame, cables with an external jacket over the screen may have the outer insulation cut away locally, "centre-stripped", to expose the screen.

The requirments of low toxicity/low flammability/fire integrity/electrical conductivity can be met by the present invention. Conductivity is the biggest problem in the known glands, a standard requirement being 0.3 ohms maximum resistance between the cable braid and the gland frame. Conductive rubbers are too resistive, unless very high filler loadings are used, e.g. silver which is expensive. One approach known prior to the present invention is believed to have been to incorporate spring-loaded metal contacts in the rubber blocks, which is undesirably complicated.

FIG. 2 shows a preferred "sandwich" design for the rubber blocks using the composite material of the present invention. In this form, the conductive composite forms the central part 21 of the block 22, with plain polymer end portions 23, preferably of the same polymer as fills the cellular structure of the composite, e.g. silicone rubber. In this, and other, constructions the cellular structure need not necessarily be completely filled, and forms of electrically conductive cellular structure such as sintered metal fibres could be used if the disadvantages of greater weight and rigidity can be tolerated.

The startng point for the preferred block is a very highly expanded polyether foam, so highly expanded as to be "skeletal", i.e. a very open celled structure. Electroless plating with an adherent coating of nickel renders it highly conductive, and it can then be filled with silicon rubber by pouring the liquid silicone rubber into it and curing it. The result is effectively highly conductive silicone rubber with minimum loss of rresilience and very low but very effective metal content.

The preferred "sandwich" of this material between plain silicone rubber end portions as described above in use allows the conductive part to contact the exposed cable braid and the plain end sections to seal against and support the cable jacket. Such a system has all the practical advantages of the known gland system with the added benefit of EMI shielding.

The use of our material, because it is so conductive allows an advantageously thin conductive part in the "sandwich" which makes up the preferred gland blocks. This leaves plenty of fire resistant rubber at the ends. A less conductive system would mean less room for fire resistant rubber or dictate thicker blocks.

What is claimed is:
1. An electrically conductive composite material comprising:
   (a) an open-celled cellular structure of polymeric material having electrically conductive material on at least its interior surface defining the cellular free space, and
   (b) substantially solid electrically non-conductive filling material substantially filling the cellular free space.
2. A composite material according to claim 1 wherein the average cell diameter of the cellular structure is within the range form 0.01 to 10 millimeters.
3. A composite material according to claim 1, wherein the cellular free space comprises 45 to 99% of the unfilled cellular structure.
4. A composite material according to claim 1, wherein the electrically conductive material is a substantially continuous coating on the interior surface of the cellular structure.
5. A composite material according to claim 4, wherein the electrically conductive coating is a metal coating.
6. A composite material according to claim 5, wherein the metal coating has been plated on the polymeric material.
7. A composite material according to claim 1, wherein the material within the cellular free space comprises polymeric material.
8. A composite material according to claim 7, wherein the polymeric material within the cellular free space has been formed in situ by polymerisation of a monomer or oligomer.
9. A composite material according to claim 1, wherein the material within the cellular free space has been introduced thereinto in a molten state and subsequently solidified.
10. A composite material according to claim 1, wherein the material within the cellular free space comprises an elastomer.
11. A dimensionally recoverable article which is provided with an electromagnetic shield comprising a composite material as claimed in claim 1.
12. A composite material according to claim 2, wherein the average cell diameter of the cellular structure is within the range from 0.2 to 2 millimeters.
13. A cable feedthrough gland for use with at least one shielded cable, the gland comprising:
   (a) an electrically conductive housing; and
   (b) a seal formed from an electically conductive composite material as claimed in claim 1, the seal being arranged to form a seal, and an electrical connection between the housing and the shield of a cable which, when the gland is in use, would extend through the housing.

* * * * *